United States Patent Office 2,909,505
Patented Oct. 20, 1959

2,909,505

ALKALI SOLUBLE RESINS AND COMPOSITIONS CONTAINING THE SAME

Sylvan O. Greenlee, Racine, Wis., assignor to S. C. Johnson & Son, Inc., Racine, Wis.

No Drawing. Application June 14, 1954
Serial No. 436,684

5 Claims. (Cl. 260—47)

This invention relates to synthetic resins and compositions containing the same. More particularly, it relates to alkali soluble resins suitable for use in removable protective coating compositions. The resins of this invention in regulated proportions are useful in the manufacture of paints, varnishes, adhesives, fabric-treating compositions, etc. Moreover, they are particularly well-suited for use in removable protective coating compositions.

In addition to wax, the use of minor amounts of resins in self-polishing non-permanent type coating compositions has been appreciated for many years. It has been found, however, that in order to obtain a composition which upon application would produce a film having maximum gloss and hardness, a resin must constitute a major proportion of the solids content of the composition. Resins suitable for use in major amounts in such compositions must have certain peculiar properties. Since nearly all the self-polishing floor coating compositions are water emulsions or dispersions, the resin must be readily dispersible in water as well as being compatible with the other components of the formulation. The resin must impart to the formulation good flow characteristics and result in a film having high gloss as well as water and mar resistance. The water resistance of the film resulting from the application of the formulation should be sufficient to allow damp mopping with cold or tepid water and yet not resistant to such a degree as to prevent its removal with hot water and soap or detergents. Finally, the resin should not result in a film which is tacky or slippery.

Heretofore, most resins have been prepared specifically for the paint and varnish, or plastics industries. These resins are necessarily of a high molecular weight and have a high water resistance, making them difficult, if not impossible, to disperse in aqueous media in the formulation of removable coatings. Certain naturally occurring resins have some desirable characteristics for incorporation in removable protective coating compositions, but are not completely satisfactory and are often difficult to obtain.

In accordance with this invention, a new resin has been discovered which possesses all the desirable properties previously mentioned and which is less expensive than the naturally occurring resins used heretofore. This resin is prepared by the partial etherification in an alkaline medium of a resinous polyhydric alcohol by a carboxylic acid, said polyhydric alcohol having the following general formula:

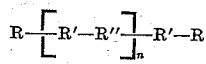

in which R is a hydroxy alkyl radical of 2 to 12 carbon atoms derived from a compound containing an ether-forming group, R' represents a dihydric phenol residue, R'' constitutes the residue of an aliphatic coupling agent, and n equals 0, 1, or 2.

The dihydric phenols suitable for use in making the resinous polyhydric alcohols may be poly-nuclear or a mono-nuclear material such as resorcinol, hydroquinone, catechol. Bisphenols having the nuclei thereof joined by an alkyl group of from 1 to about 10 carbon atoms are conveniently used in the preparation of the resinous polyhydric alcohols herein described. Alkylidenediphenols such as methylidenediphenol and higher alkylidenediphenols prepared by the condensation of ketones with phenols are eminently suitable. Methylidenediphenol is prepared by reacting phenol with formaldehyde under conditions where the formaldehyde is controllably released as from such compositions as methylol ureas. The reaction of acetone with phenol gives a mixture of p,p'-isopropylidenediphenol along with small amounts of the corresponding ortho isomers. Likewise, the reaction of cyclohexanone with ortho cresol would give the cyclohexylidenedi-o-cresol. Examples of other suitable polynuclear dihydric phenols which may be advantageously employed are p,p'-dihydroxybenzophenone, p,p'-dihydroxydiphenyl, p,p'-dihydroxydibenzyl, any of the dihydroxyanthracenes, dihydroxynaphthalenes, sulfones such as bis(p-hydroxyphenyl)sulfone, or other phenols wherein the nuclei are coupled by sulfur or oxygen atoms.

The coupling agents advantageously used in building up the molecular structure desired for the resinous polyhydric alcohols should be bifunctional in their reactions with the dihydric phenols in the presence of alkali. In this respect, a material is considered bifunctional when it is capable of forming a pair of ether linkages with two phenolic hydroxyl groups. It has been found that suitable coupling agents of this description should be based on an aliphatic structure having no more than about 10 carbon atoms and that such agents fall within three general categories: epihalohydrins, diepoxides, and dihalides with the ethers of these materials also being suitable.

Epichlorhydrin is bifunctional in reactions with dihydric phenols in that the epoxide and the chloride each reacts with a phenolic hydroxyl group in the presence of alkali to form ether linkages between the epichlorhydrin residue and that of the dihydric phenol. Epihalohydrins other than epichlorhydrin such as epibromohydrin and those structures in which one of the carbon atoms has been replaced by an ether exygen such as 2,3-epoxypropyl-2-hydroxy-3-chloropropyl ether also may be used.

Since the epoxide group reacts with the phenolic hydroxyl group to form an either linkage, diepoxides may be used as the bifunctional coupling agents in reactions with dihydric phenols. Exemplary diepoxides are 1,2-epoxy-3,4-epoxybutane and those in which one of the carbon atoms has been replaced by an ether oxygen such as bis(2,3-epoxypropyl)ether. The term epoxide as used throughout this patent description refers to ethyleneoxides or those epoxides in which the oxygen is linked to adjacent carbon atoms to form a three-membered ring.

The coupling agent may also be an aliphatic dihalide since these materials are also bifunctional with respect to the dihydric phenols. It has been found that dihalides in which one of the carbon atoms has been replaced by an ether oxygen are useful in preparing the resinous polyhydric alcohols. Exemplary dihalides are 1,2-dichloroethane, 1,3-dichloropropane, 1,2-dibromoethane, 1,3-dibromopropane, 1,10-dichlorodecane, the dihalides of corresponding olefins such as 1,4-dichlorobutene-2 and ethers such as bis(2-chloroethyl)ether, bis(beta-chloroisopropyl)ether, and bis(2-chloroethyl)formal.

The materials suitable for use in forming the terminal hydroxy alkyl radicals of the polyhydric alcohols may be bifunctional, but in such case, preferably react with the phenolic hydroxyl groups to form ethers through only one of the functional groups. Materials such as those described hereinabove as being suitable for use as coupling agents may be employed, but because of the difficulty of avoiding polymerization, it is preferred that materials which are monofunctional, with respect to the dihydric phenols, be employed. As with the coupling agents, one of the carbon atoms of the terminal hydroxy-alkyl radicals may be replaced by an ether oxygen. Suitable monofunctional hydroxy alkyl compounds are the hydroxy monoalkyl halides and the monoepoxides. The hydroxy monoalkyl halides include the monohalides which contain 1 or 2 hydroxyl groups and from 2 to about 12 carbon atoms. Illustrative compounds are ethylene chlorhydrin, glycerol monochlorhydrin, 3-hydroxypropyl chloride, and beta-hydroxyethyl beta-chloroethyl ether. Suitable monoepoxides which may be employed should contain from 2 to about 10 carbon atoms, one of which also may be replaced by an ether oxygen atom. Suitable monoepoxides which may be employed are ethylene oxide, propylene oxide, and 1,2-epoxypropyl 1,2-propenyl ether.

The carboxylic acid suitable for use in the preparation of the resinous alkoxy acids of this invention are those which contain up to about 8 carbon atoms and a single functional group capable of reacting with a hydroxyl group to form an ether. For sufficient reactivity, it is preferred that the functional group be located on the alpha-carbon atom in such acids. Exemplary acids are the alpha monohalo acids such as chloroacetic acid, 2-chlorocaprylic acid, 2-bromovaleric acid, etc.

A typical resinous polyhydric alcohol is illustrated by the reaction product of 2 mols of p,p'-isopropylidenediphenol in the presence of alkali with 1 mol of epichlorhydrin and 2 mols of ethylene chlorhydrin to give the following composition:

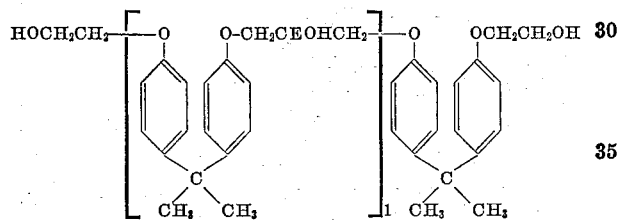

Such resinous polyhydric alcohols are then reacted in the presence of strong alkali with an ether-forming carboxylic acid such as chloroacetic acid to accomplish etherification of a sufficient quantity of the hydroxyl groups present in the resinous polyhydric alcohol to give an alkoxy acid having an acid value in the range of 50 to 100. The acid value as used herein is defined as the number of milligrams of potassium hydroxide which is equivalent to the acid content of 1 gram of the sample. Illustrative of the type of structure which may be formed on reacting chloroacetic acid with the above resinous polyhydric alcohol is the following:

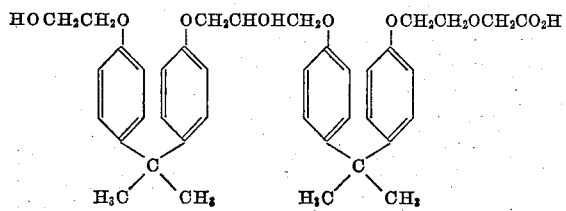

In practice, however, the reaction products are mixtures in which some of the molecules of the resinous polyhydric alcohol are etherified through different alcoholic hydroxyl groups or by more than one molecule of the ether-forming acid.

In preparing the resinous alkoxy acids of this invention, there is a great deal of latitude possible in selecting the resinous polyhydric alcohols and ether-forming acids to be employed. The only limitations which exist are those which would be required to produce a product having an acid value of 40 to 100 in order that the necessary alkali-solubility may be attained. It follows that the materials used in preparing the resinous polyhydric alcohols, i.e., the dihydric phenols, coupling agents, and hydroxy-alkyl compounds may also be widely varied.

The reaction of a phenolic hydroxyl group with an alkyl halide forms an ether linkage by the well known Williamson ether synthesis:

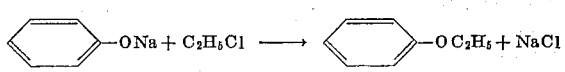

Phenol also reacts with an epoxide group to form a hydroxy ether:

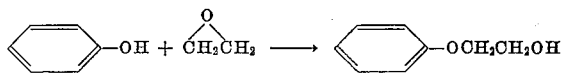

It will be seen that these two typical reactions may be used in building up the structure of the resinous polyhydric alcohols. For example, the reactions leading to a typical resinous polyhydric alcohol prepared from 2 mols of p,p'-isopropylidenediphenol, 1 mol of dichlorodiethyl ether, and 2 mols of ethylene chlorhydrin are as follows:

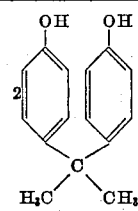 + ClCH₂CH₂OCH₂CH₂Cl + 2HOCH₂CH₂Cl + 4NaOH ⟶

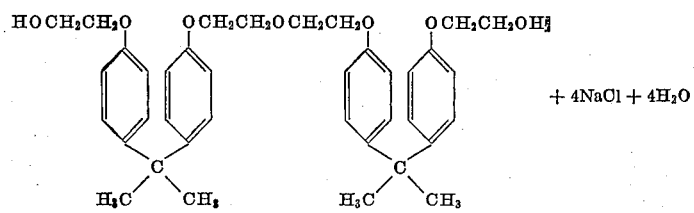

+ 4NaCl + 4H₂O

The reaction of 2 mols of ethylene oxide with 1 mol of cyclohexylidenedi-o-cresol would give the following structure:

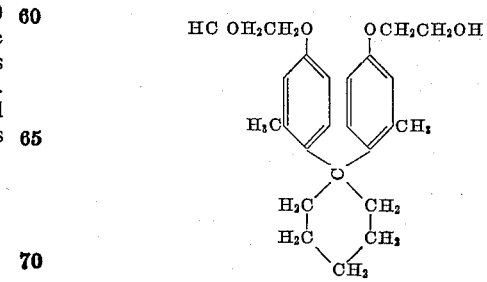

The reaction of an ether-forming acid with a resinous polyhydric alcohol may be illustrated by the reaction of 1 mol of chloroacetic acid with 1 mole of the bis(beta hydroxyethyl)ether of p,p'-isopropylidenediphenol:

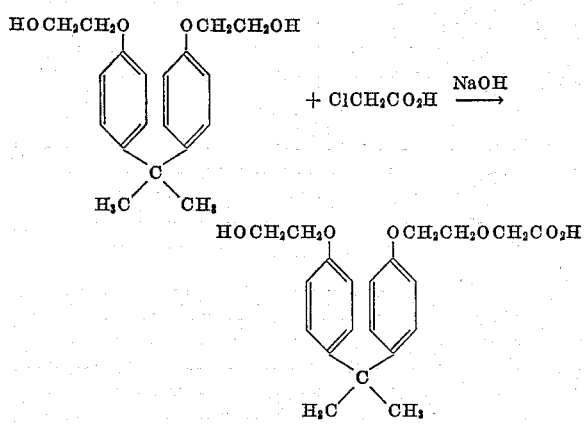

It should be understood that the illustrative reactions set forth are not without side reactions although by properly adjusting the molar proportions of the reactants and the reaction conditions, the desired products may be obtained in predominant amounts. In the formulation of self-polishing coating compositions based on the new resinous synthetic esters of this invention, it has been found that the side reaction products are not present to such a degree as to be detrimental to the desired performance of the coating.

Although in the illustrative reactions above, the value of $n$ is 0 and 1, in the general formula for the polyhydric alcohols,

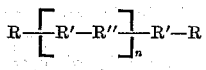

its value depends upon the reactants employed together with the properties desired and may equal 0, 1 or 2. Compounds having higher values for $n$ are insufficiently soluble in alkali solutions and coatings prepared therefrom have an unsatisfactory balance of water-resistance properties. Some latitude in choosing the optimum combination of ingredients is desirable. When a given performance is desired in two resins which are prepared from different dihydric phenols, it may be necessary to vary the ratio of ingredients in order to produce products having molecular weights of such values as to give the desired balance of performance characteristics. Similarly, two resinous alkoxy acids having the same hydrophilic properties, one of which is based upon the use as a coupling agent of epichlorhydrin, the other being based upon the used of bis(beta-chloroethyl)ether, would not necessarily be obtained by using the same molar proportions of reactants.

Because of the upper limit for the value of $n$, the preferred resins of this invention will contain no more than 3 dihydric phenol residues per molecule. But because of the plethora of coupling agents and terminal hydroxyalkyl radicals possible, the hydroxyl groups per molecule may range up to about 8 in number.

Generally, the resinous alkoxy acids which are suitable for use in the self-polishing coating compositions of this invention have softening points falling within the range of 45–90° C. Softening points as used throughout this description were determined by the Durrans' Mercury Method (Journal of Oil and Colour Chemists' Association, 12, 173–5 [1929]). It is important that the alkoxy acids of this invention have a sufficient degree of acidity to provide the desired solubility in alkali solutions. Requisite acidity for this purpose is represented by an acid value in the range of 50 to 100.

The following are illustrative examples of the preparation of the alkali-soluble resins of this invention, parts being given by weight unless otherwise indicated:

*Example I*

166 parts of epichlorhydrin was added at 72° C. to a constantly agitated solution of 684 parts of p,p'-isopropylidenediphenol dissolved in 2000 parts of water containing 120 parts of caustic soda. With continuous agitation the reaction temperature was raised to 90–95° C. and held for one hour after all the epichlorhydrin had been added. A solution of 120 parts of caustic soda in 500 parts of water was added. After 20 minutes the temperature had dropped to 70° C. and 241 parts of ethylene chlorhydrin was added over a period of 20 minutes while the temperature rose to 78° C. The temperature was then raised to 95° C. and maintained at 95–100° C. for one hour when 235 parts of 37% hydrochloric acid was added and agitation continued for one-half hour. The aqueous layer was then removed by decantation and the product washed 4 times using 2000 parts of hot water for each wash. The resin was dried by heating to 130° C. to give 808 parts of a product melting at 65° C., and having a hydroxyl value of 274.

*Example II*

Over a period of 10 minutes at 84–86° C., 80 parts of 50% aqueous caustic soda was added to a constantly agitated mixture consisting of 120 parts of the product from Example I, 39 parts of chloroacetic acid and 69 parts of isopropanol in a flask fitted with reflux condenser. The reaction mixture was agitated at reflux for one and one-half hours and then transferred to an open beaker containing 300 parts of water and 80 parts of 37% hydrochloric acid. Agitation was continued at 95–100° C. for one-half hour and then the aqueous layer was removed by decantation and the product washed 7 times using 500 parts of hot water for each wash. The resin was dried by heating to 130° C. to give 113 parts of a product melting at 77° C. with an acid value of 72 and a hydroxyl value of 195.

*Example III*

429 parts of bis(beta-chloroethyl)ether was added to an agitated solution of 1140 parts of p,p'-isopropylidenediphenol dissolved in 1500 parts of water containing 320 parts of caustic soda. The reaction mixture temperature was maintained at 128–142° C. for 7 hours (a closed pressure reactor provided with agitation was used for this preparation). After the mixture had cooled to 98° C., the water layer was removed by decantation and the product was washed 5 times with 2500 parts of hot water in the usual manner. This intermediate resinous product was dried by heating to 130° C. to give 1271 parts of a product melting at 55° C.

To a constantly agitated solution of 600 parts of this resinous product dissolved in 1573 parts of water containing 73 parts of caustic soda was added 144 parts of ethylene chlorhydrin over a period of 30 minutes at 63–68° C. The temperature was raised to 90–95° C. and maintained there for 2 hours when 57 parts of 37% hydrochloric acid was added and the reaction mixture stirred an additional half hour at 90–95° C. Then the aqueous layer was decanted and the product washed 3 times using 1500 parts of hot water for each wash. The product was dried by heating to 130° C. to give 582 parts of a resinous material melting at 49° C. and having an alcoholic hydroxyl value of 164.

*Example IV*

80 parts of 50% aqueous caustic soda was added, over a period of 20 minutes at 74–81° C., to a constantly agitated mixture of 120 parts of the product from Example III, 38 parts of chloroacetic acid and 69 parts of isopropanol in a flask fitted with reflux condenser. The reaction mixture was agitated at reflux for one hour and then transferred to an open beaker containing 300 parts of water and 80 parts of 37% hydrochloric acid. Agitation was continued for 1 hour at 90–95° C. and then the aqueous layer was removed by decantation and the product washed 6 times using 500 parts of hot water for each wash. The resin was dried by heating to 115° C. to give 118 parts of a resin melting at 55° C. having an acid value of 57 and a hydroxyl value of 80.

All the resinous alkoxy acids of the preceding examples are readily soluble in alkaline media. The resins produced in accordance with the procedures set forth in Examples I through IV are suitable for use in blends with wax emulsions for formulating self-polishing protective coating compositions which have the desired balance of water-resistance for non-permanent type coatings. It is necessary that the resins of this invention be soluble in the various alkaline materials which have been found advantageous in formulating non-permanent type protective coating compositions. These alkaline materials include aqueous solutions of borax, ammonia, amines, and sodium hydroxide. A convenient method of dissolving the resinous alkoxy acids is to add the aqueous alkali after the last step in preparing the resin, i.e., following the step of washing with hot water so that the resin is still in the molten state. Where the resin has been freed from water after its preparation and washing and has been allowed to cool to room temperature, it is preferred that it be pulverized before the addition of the hot aqueous alkali. Solutions of the synthetic resins prepared in this manner have been found to be stable in storage for prolonged periods.

The resinous alkoxy acids herein described are completely miscible with shellac and often are used therewith in the formulation of self-polishing protective coatings. The resins may be conveniently blended with shellac by dissolving both materials simultaneously in an aqueous alkali solution, or alkaline solutions of each of the materials may be made individually and introduced together in a product formulation. The resinous alkoxy acids are conveniently blended with wax emulsions by first preparing the alkali solutions of the former and mixing the same directly with the wax emulsions.

It may be sometimes desirable to use certain resins other than shellac along with the resinous alkoxy acids in the formulation of self-polishing protective coatings. Such resins are illustrated by the ester gum and terpene phenolic types which have been found to be sufficiently miscible with waxes so that they may be incorporated in the final formulation.

In the following examples illustrating the preparation of typical non-permanent type coating compositions, the expressed proportions are by weight unless otherwise indicated.

*Example V*

An alkali solution of shellac for use with the resins of this invention was prepared by adding 25.7 parts of shellac to a continuously stirred solution containing 68.7 parts of water and 5.6 parts of borax at 60 to 65° C. Sufficient water was subsequently added to give a non-volatile content of 25%.

A wax emulsion was prepared by adding to a molten mixture of 61.7 parts of oxidized microcrystalline wax and 26.5 parts of a terpene phenolic resin (softening point 150–160° C.) at 150° C., 11.8 parts of oleic acid and thoroughly mixing the resulting composition. To this mixture at 105–110° C. was added 4 parts of triethanolamine and 5 parts of 48% caustic soda, the temperature being maintained with intermittent stirring, for 15 minutes. This mixture was then poured in a slow, steady stream into 745 parts of water at 94–98° C. with rapid agitation to give an emulsion (12.5% non-volatile) which was then rapidly cooled to 28° C. or less.

An aqueous borax solution of the resinous synthetic ester prepared in accordance with Example II may be made up by adding 16.8 parts of the synthetic ester to 130 parts of water which contains 4.2 parts of commercial borax. The temperature is adjusted to 85° C. and the composition stirred until a clear solution is obtained (about 15 minutes).

A self-polishing floor finish was obtained by mixing 50 parts of the borax solution of the resin with 25 parts of the shellac solution described above, 25 parts of water and 28.2 parts of the wax emulsion prepared as described.

*Example VI*

A typical aqueous borax solution of the resinous acid from Example IV is prepared by adding 20 parts of the resinous acid to 150 parts of water containing 3.0 parts of commercial borax, adjusting the temperature to 85° C. and stirring until a clear solution is obtained (around 15 minutes).

A satisfactory self-polishing floor finish may be prepared by following the procedure outlined in Example V, but substituting 50 parts of the borax solution of the alkoxy acid of Example IV prepared as herein described for the borax solution of the resinous acid of Example II.

The self-polishing compositions illustrated above provide coatings which give a smooth glossy surface after less than 30 minutes drying time at normal temperatures on conventional flooring such as linoleum, asphalt tile, vinyl tile, and rubber tile. These coatings may be satisfactorily damp-mopped after drying overnight and may be readily removed by mopping with alkaline cleaners.

The resinous alkoxy acids also contribute unusually good flow characteristics to the self-polishing coatings so that the films formed therefrom are glass-like in smoothness, being perfectly free from any pitting or orange peel surface effect. An unusually high gloss is obtained from floor coatings of these materials, and it remains even after several damp moppings. The gloss-contributing characteristics of the resinous alkoxy acids are such that high gloss finishes are obtained even when the non-volatile content of self-polishing floor coatings formulated therefrom is as low as 7 or 8%, whereas much higher non-volatile contents are usually required in order to get satisfactory gloss from the conventional self-polishing floor finishes. Self-polishing floor finishes formulated by blending the resinous alkoxy acid with waxes are unusually clear and free from haze, indicating good miscibility of actual dried film constituents and a freedom from forming insoluble film constituents on aging. It has been observed that self-polishing floor coatings, based on the use of blends of these resins with other polish ingredients, give films which are unusually free from the water-spotting so common to many commercial non-permanent type floor coating materials.

The above-disclosed are but a limited number of embodiments of the product of the invention herein presented, for it is possible to produce still other embodiments without departing from the inventive concept herein disclosed, and it is desired therefore that only such limitations be imposed on the appended claims as are stated therein, or required by the prior art.

I claim:

1. An alkali soluble resinous alkoxy acid which is an ether of a monohydroxy monocarboxylic acid of 1 to 8 carbon atoms and a polyhydric alcohol wherein the polyhydric alcohol has the general formula

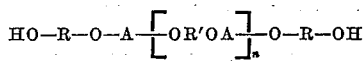

wherein R is a radical of 2 to 12 carbon atoms selected from the group consisting of divalent aliphatic hydrocarbon radicals and divalent aliphatic oxa-hydrocarbon radicals, any substituent groups being only —OH in a position beta to the valences of the radical; R' is a radical of 2 to 10 carbon atoms selected from the group consisting of divalent aliphatic hydrocarbon radicals and divalent aliphatic oxahydrocarbon radicals, any substituent groups being only —OH in a position beta to the valences of the radical; A is at least one member selected from the group consisting of arylene and alkylidene diarylene radicals and $n$ has a value of 0 to 2, said resinous acid having an acid value of from 50 to 100.

2. An alkali-soluble, resinous alkoxy acid which is an ether of monohydroxy acetic acid and the polyhydric alcohol

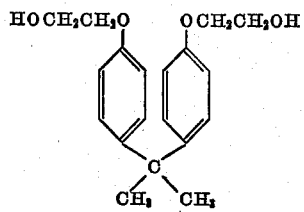

3. An alkali-soluble, resinous alkoxy acid which is an ether of monohydroxy acetic and the polyhydric alcohol

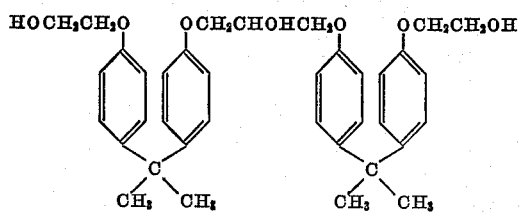

4. An alkali-soluble, resinous alkoxy acid which is an ether of monohydroxy acetic acid and the polyhydric alcohol

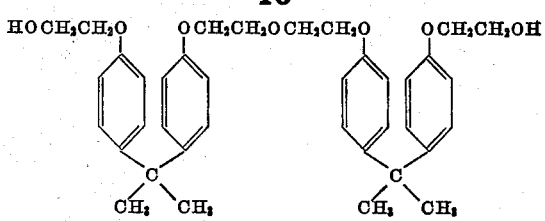

5. An alkali-soluble, resinous alkoxy acid which is an ether of monohydroxy acetic acid and the polyhydric alcohol

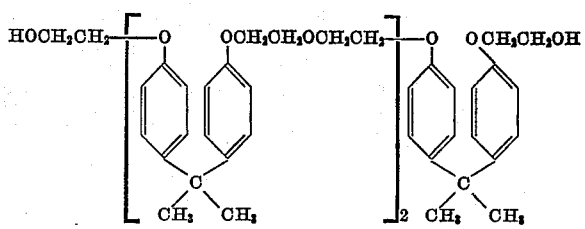

References Cited in the file of this patent
UNITED STATES PATENTS

| | | |
|---|---|---|
| 2,444,594 | Day et al. | July 6, 1948 |
| 2,503,726 | Greenlee | Apr. 11, 1950 |
| 2,558,949 | Greenlee | July 3, 1951 |
| 2,686,164 | Arvin et al. | Aug. 10, 1954 |

UNITED STATES PATENT OFFICE

CERTIFICATE OF CORRECTION

Patent No. 2,909,505                             October 20, 1959

Sylvan O. Greenlee

It is hereby certified that error appears in the printed specification of the above numbered patent requiring correction and that the said Letters Patent should read as corrected below.

Column 2, line 17, for "p,p′-dihyqdroxydibenzyl" read -- p,p′-dihydroxydibenzyl --; column 3, line 30, in the formula, for that portion within the brackets reading "O-CH$_2$CEOHCH$_2$" read -- O-CH$_2$CHOHCH$_2$ --; column 4, line 60, for that portion of the formula reading "HC OH$_2$CH$_2$O" read -- HOCH$_2$CH$_2$O --; column 5, line 53, for "used" read -- use --; column 9, line 16, claim 3, after "acetic" insert -- acid --.

Signed and sealed this 13th day of September 1960.

(SEAL)
Attest:

KARL H. AXLINE                                                 ROBERT C. WATSON
Attesting Officer                                         Commissioner of Patents